July 4, 1967 — B. AMMON — 3,329,452
COUPLING MEANS FOR ATTACHING A KNOB TO A SHAFT
Filed Dec. 31, 1964
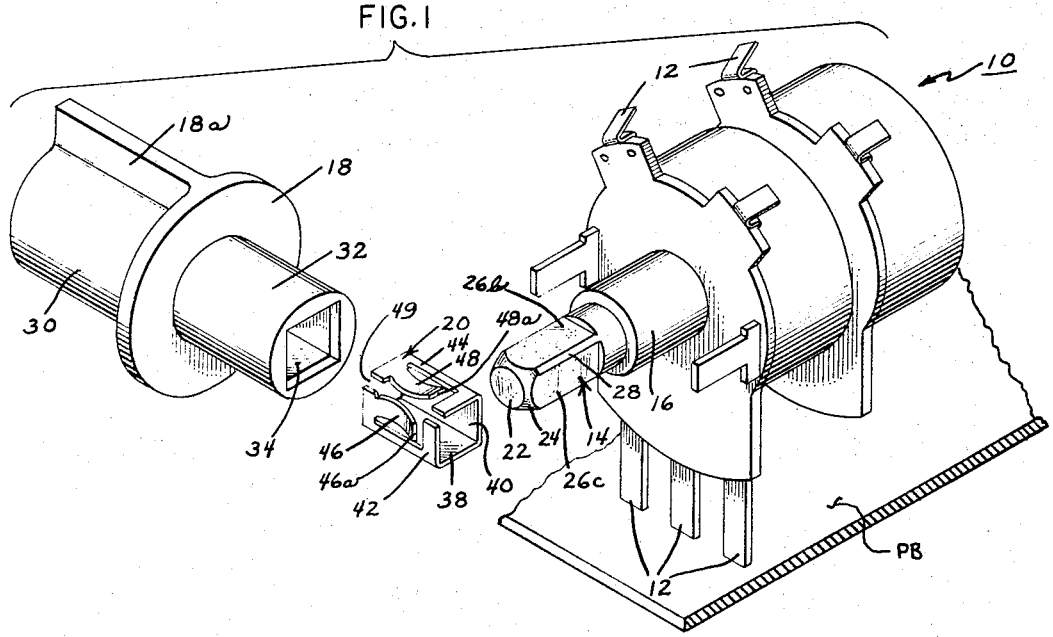
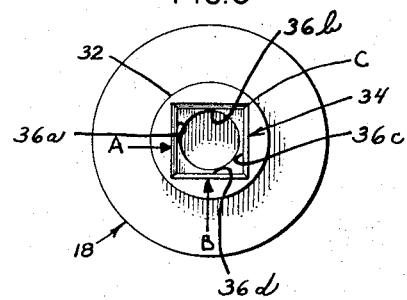
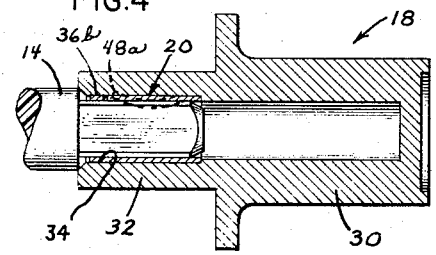
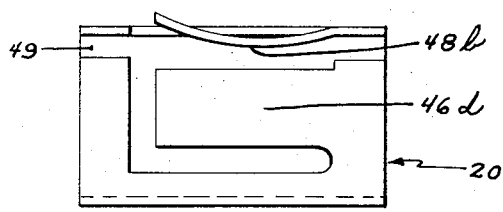
INVENTOR:
BRUNO AMMON,
BY Thomas A. Briody
HIS ATTORNEY.

3,329,452
COUPLING MEANS FOR ATTACHING A KNOB TO A SHAFT
Bruno Ammon, Decatur, Ill., assignor to General Electric Company, a corporation of New York
Filed Dec. 31, 1964, Ser. No. 422,735
1 Claim. (Cl. 287—53)

This invention relates to an attaching means, and more particularly to an improved means for attaching a knob to the outer end of a shaft for establishing a driving connection therebetween.

To securely couple most removable knobs of the prior art to apparatus control shafts and establish a driving connection between, a generally cylindrical end portion of the shaft having a flatted surface thereon has been fitted into cooperation with an appropriately configured recess formed in the knob. Various types of springs have been utilized to resiliently yet removably enable the shaft to be coupled to the knob. The spring is usually located between the flatted end portion of the shaft and the knob recess. Such a coupling arrangement has been found in many instances to be undesirable, in view of the fact that the coupling connection between the knob and the shaft must always be established with the knob in the same initial orientation relative to the shaft. To help facilitate the interchangeability of components in modern day appliances, it has been found desirable to provide an improved coupling means for attaching the knob to a shaft wherein positive engagement is readily provided in conjunction with flexibility in orientation of the knob relative to the shaft.

The principal object of the present invention is to provide a new and improved means for attaching a knob or like element to a shaft to establish a driving connection therebetween.

Another object of the present invention is to provide an improved coupling means for a knob and a shaft, whereby a positive connection therebetween is facilitated while at the same time allowing 90 degree flexibility in orientation between the knob and the shaft.

A further object of my invention is to provide an improved means for removably attaching a knob to a shaft, which means includes a novel configuration and arrangement is relatively low in cost.

In carrying out the present invention, in one form thereof, it is applied to a control assembly which includes a shaft member and a knob member. The knob member is constructed and arranged for removable cooperation with one end of the shaft member. To facilitate orientation flexibility between the knob and the shaft member while at the same time allowing positive cooperation therebetween, the shaft member has a square-shaped cross-section adjacent its outer end. The knob member includes a recess which has a square-shaped cross-section for receiving and cooperating with the outer end of the shaft. To provide resilient coaction between the knob member and the shaft member, a rectangularly configured resilient element is fitted around the outer end of the shaft member and sandwiched between the shaft and the knob. With such an arrangement, 90 degree flexibility in orientation of the knob relative to the shaft is readily obtained. This approach thus provides manufacturing flexibility and is, at the same time, very low in cost.

Further aspects of my invention will become apparent hereinafter, and the specification concludes with the claim particularly pointing out and distinctly claiming the subject matter which I regard as my invention. The invention, however, as to organization and method of operation, together with further objects and advantages thereof, may best be understood by reference to the following description, when taken in conjunction with the accompanying drawing in which:

FIGURE 1 is a perspective exploded view of a potentiometer shaft and knob coupling arrangement, in accordance with one form of my invention;

FIGURE 2 is a front view of the potentiometer of FIG. 1, with the detent element and knob removed therefrom;

FIGURE 3 is a back view (i.e. from the recessed end) of the knob of FIG. 1;

FIGURE 4 is a sectional view of the knob when assembled to the outer end of the shaft; and FIGURE 5 is a rear elevation view of the detent element shown in FIG. 1.

Referring now to the drawing for a detailed explanation of the present invention, attention is initially directed to FIGURE 1. As shown therein, there is a two level potentiometer 10 having a plurality of terminals 12. Potentiometer 10 has its rotors (not shown) controlled by shaft 14, which extends outwardly from the supporting bushing 16. The outer end of shaft 14 removably and resiliently cooperates with knob 18 by means of a spring element 20.

As further shown in FIG. 1, the shaft 14 includes a flat and circular outermost end 22 and a substantially conical bevelled surface 24 which is conterminous with and extends from the flat surface 22. As also shown in FIG. 2, the outer end of shaft 14 includes four elongated sides 26a, 26b, 26c, and 26d which are conterminous at their outer ends with the conical surface 24 and are connected to each other by elongated angular surfaces 28. The elongated sides 26a–26d preferably have the same width, thereby to provide a square-shaped cross-section. The purpose of the arrangement of the surfaces 26a–26d of the shaft 14 shall become apparent hereinafter.

The knob 18 may be of metallic or plastic construction and it generally includes a manually engageable handle section 30 having a pointer 18a formed thereon, and a supporting shank portion 32. The shank portion 32 has an externally cylindrical configuration, and a recess 34 formed therein. The recess 34 of the knob 18 has a generally square-shaped configuration to enable it to receive in complementary fashion the outer end of the shaft 14. Thus, more particularly, the recess 34 (as shown in FIG. 3) includes four walls 36a, 36b, 36c and 36d, each opposite pair of which are spaced farther apart than the elongated external sides 26a–26d of shaft 14 for enabling the shaft 14 to be readily fitted into recess 34 of the knob 18 with sufficient clearance for spring element 20.

As further shown in FIGS. 1 and 5, the illustrated embodiment of the present invention also provides a split box-like detent element 20 which is specially adapted to resiliently cooperate with the shaft 14 and enable it to be snugly ensconced within recess 34 of knob 18. The element 20, like shaft 14, has a generally square-shaped configuration. More particularly, as shown in FIG. 1, the detent element 20 includes a pair of elongated flat uninterrupted walls 38 and 40 which are connected together at a right angle. Viewing further FIG. 1, the bottom wall 38 is connected at a right angle to an upright side wall 42 having a resilient tongue 46 formed therein. The upright uninterrupted side wall 40 is connected at a right angle to a top wall 44 which has a resilient tongue 48 formed therein. As further shown in FIGS. 1 and 5, there is a split 49 between wall 42 and 44 to enable them to flex slightly relative to their respective connections to walls 38 and 40. The walls 38, 40, 42 and 44 are all of the same general width so that the detent element 20 has a substantially square-shaped cross-section.

Turning now to a description of the mode of operation of the coupling arrangement of my present invention, attention is directed to both FIGS. 1 and 4. For attachment of knob 18 to shaft 14, the detent element 20 is first inserted in recess 34 of knob 18 in such a manner that the four walls 38, 40, 42 and 44 of the detent element 20 are generally contiguous with associated walls 36a, 36b, 36c and 36d of the recess 34 of the knob 18. The sizes of the walls of the detent element 20 are such that the free ends 46a and 48a of the tongues 46 and 48 dig into contiguous associated walls of the recess 34, as indicated in FIG. 4. Thus, more particularly, as shown in FIG. 4, the free end 48a of tongue 48 is digging into wall 36b of the recess 34. It will also be understood that the free end 46a of tongue 46 digs into another associated contiguous wall of the recess 34, such as for example, wall 36a of the recess. As a result of the free ends 46a, 48a of the tongues 46 and 48 of the detent element, and their mode of cooperation with the contiguous associated walls of recess 34, the detent element 20 is frictionally engaged with the recess 34 after it is inserted therein.

The knob 18 with the detent element 20 already inserted in its recess 34, is then fitted upon the outer end of potentiometer shaft 14. The shaft 14 thereupon extends inside of and generally through the detent element 20, and the inwardly bulged or bow-shaped surfaces 48b and 46d of the resilient tongues 48 and 46 are thereupon arranged in compression with the flat surfaces 26b and 26c, respectively of the shaft 14. As a result of the compressive moments imparted to the shaft surfaces 26b and 26c by the inwardly bulged portions 48b, 46d of tongues 48 and 46, the outer end portion of shaft 14 is generally urged toward a corner of the recess 35 opposite the corner of the recess which is adjacent the corner of the shaft generally described by the intersection of surfaces 26b and 26c. For example, as shown in FIG. 3, the compressive forces indicated by arrows A and D, urge the shaft 14 transversely from its normal axis toward corner C of the recess 34. It will thus be understood that the detent element 20 effectively resiliently biases the shaft 14 into positive frictional engagement with its mating recess 34.

It will further be understood that when the square-shaped shaft 14 is in cooperation with the square-shaped recess 34 of the knob 18, the various sides of the four-sided detent element 20 are sandwiched between adjacent contiguous walls of the shaft 14 and the recess 34 of the knob 18.

As further shown in FIG. 1, the potentiometer 10 is of the type which is mounted on a printed circuit board PB. To facilitate interchangeability of the printed circuit board in various types of appliances, such as phonographs, it may become desirable to mount the printed circuit board in various positions. In accordance with the present invention, the printed circuit board incorporating the potentiometer 10 may be arranged in four different alternative positions each of which is spaced 90 degrees apart, while the knob 18 has its pointer 18a assuming the same visual orientation (e.g. pointing up) for the user. A significant advantage of my invention therefore resides in the fact that the knob 18 is flexible in orientation relative to the potentiometer 10. By the same token, the potentiometer 10 is flexible in orientation relative to the knob.

It will now, therefore, be seen that my new and improved knob and shaft coupling arrangement is illustated herein provides a simplified and effective means for removably and positively establishing a driving connection between these two members and also affording flexibility in orientation of the two members. It will be understood further that my knob and shaft attachment means comprises a minimum number of parts and is relatively inexpensive to manufacture.

While in accordance with the patent statues, I have described what at present is considered to be the preferred embodiment of my invention, it will be obvious to those skilled in the art that various changes and modifications may be made therein without departing from my invention and I, therefore, aim in the following claim to cover all such equivalent variations as fall within the true spirit and scope of this invention.

What I claim as new and desire to secure by Letters Patent in the United States is:

A control assembly comprising a shaft member and a knob member arranged for removable cooperation with one end of said shaft member, said shaft member having four flat sides arranged in a generally square-shaped external configuration on said one end, said knob member including a recess having four walls arranged in a generally square-shaped configuration for receiving and cooperating with the sides of said shaft, indexing means on said knob member, and a four-sided split sleeve spring of substantially square section which fits into contiguity with the four walls of the knob recess and is effectively sandwiched between the walls of the knob recess and the four flat sides of the shaft for resiliently urging one corner of the square-shaped end of said shaft laterally toward an adjacent corner of said recess for securing said knob member to said shaft member, whereby said indexing means of said knob may be oriented into four discrete relationships with respect to said shaft, thereby to enhance the flexibility of unilization of said control assembly, said split extending along a corner of said sleeve, and two conterminous sides of the spring element bordering said split each having a resilient tongue formed thereon, each of said resilient tongues imparting a force normal to and against one of said two sides, thereby to urge one corner of the square-shaped end of the shaft laterally toward an adjacent corner of said recess.

References Cited
UNITED STATES PATENTS

| | | | |
|---|---|---|---|
| 2,158,728 | 5/1939 | Peters | 297—102 |
| 2,496,700 | 2/1950 | Cole. | |
| 2,567,884 | 9/1951 | Heath | 85—36 |
| 2,815,230 | 12/1957 | Howie | 287—53 |

FOREIGN PATENTS 424,516  1935  Great Britain.

CARL W. TOMLIN, *Primary Examiner.*

A. V. KUNDRAT, *Assistant Examiner.*